A. KINGSBURY AND F. L. O. WADSWORTH.
BEARING.
APPLICATION FILED JUNE 3, 1918.
1,436,265.
Patented Nov. 21, 1922.
3 SHEETS—SHEET 1.
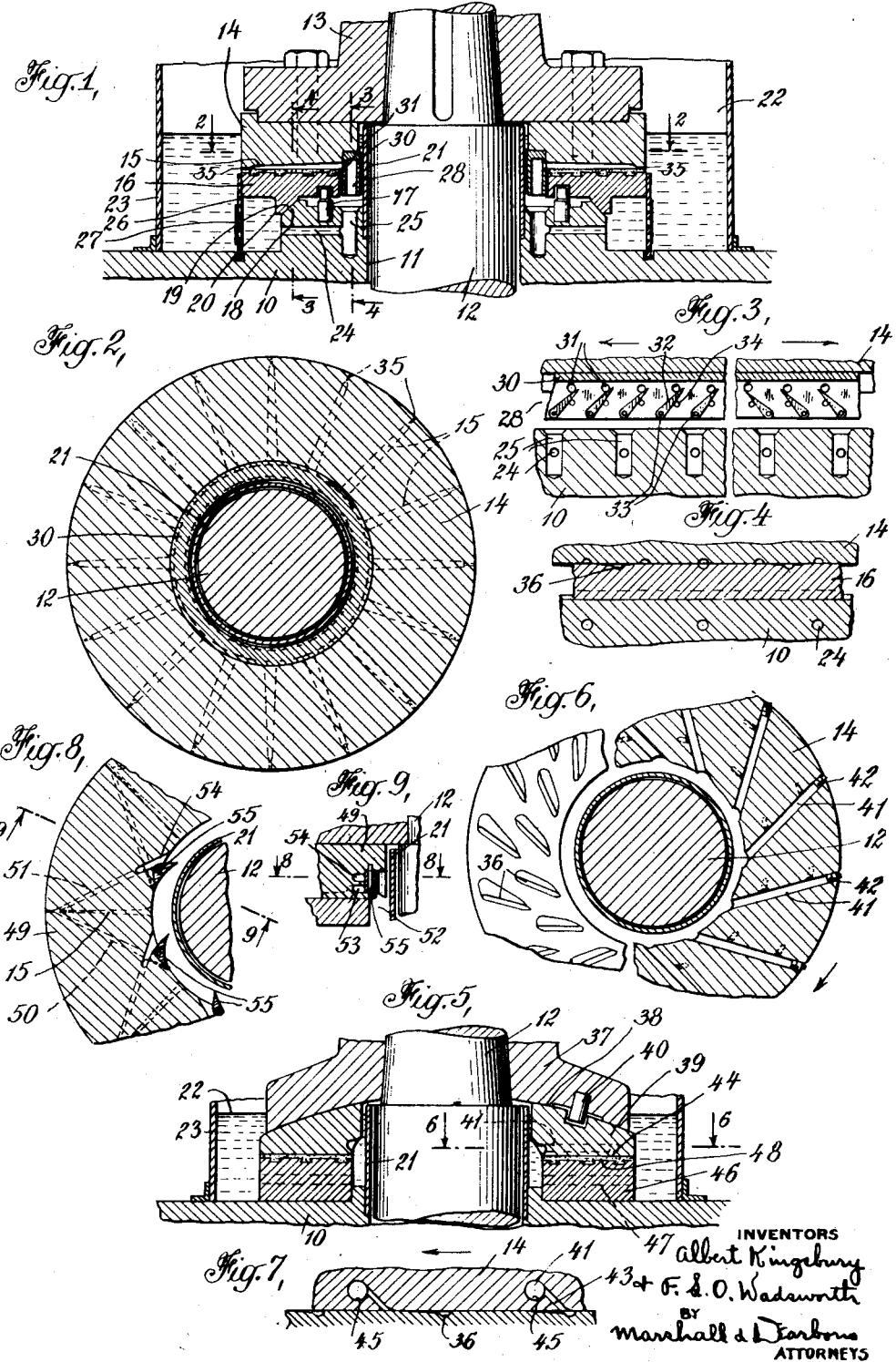
INVENTORS
Albert Kingsbury
& F. L. O. Wadsworth
BY
Marshall & Dearborn
ATTORNEYS

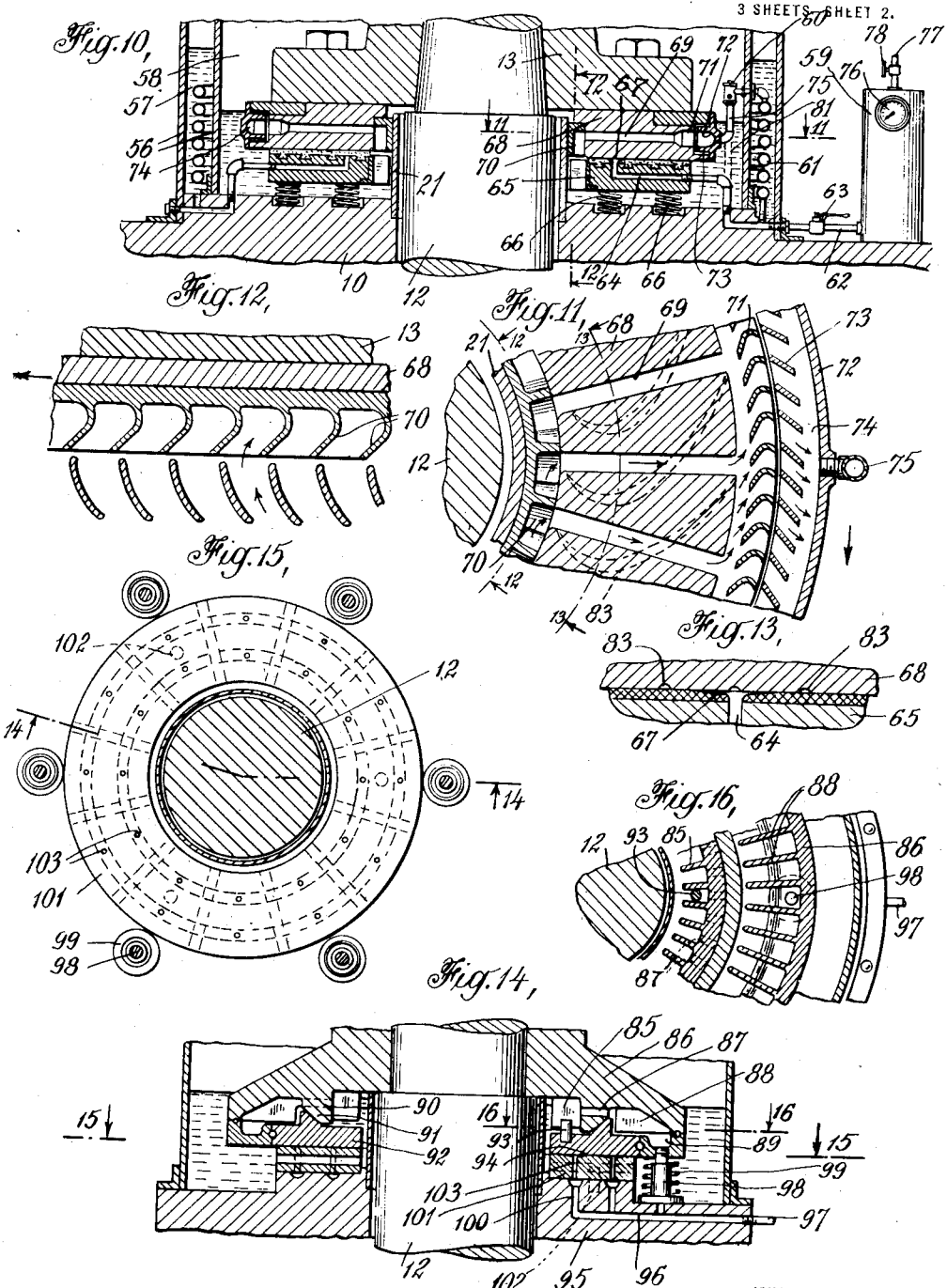

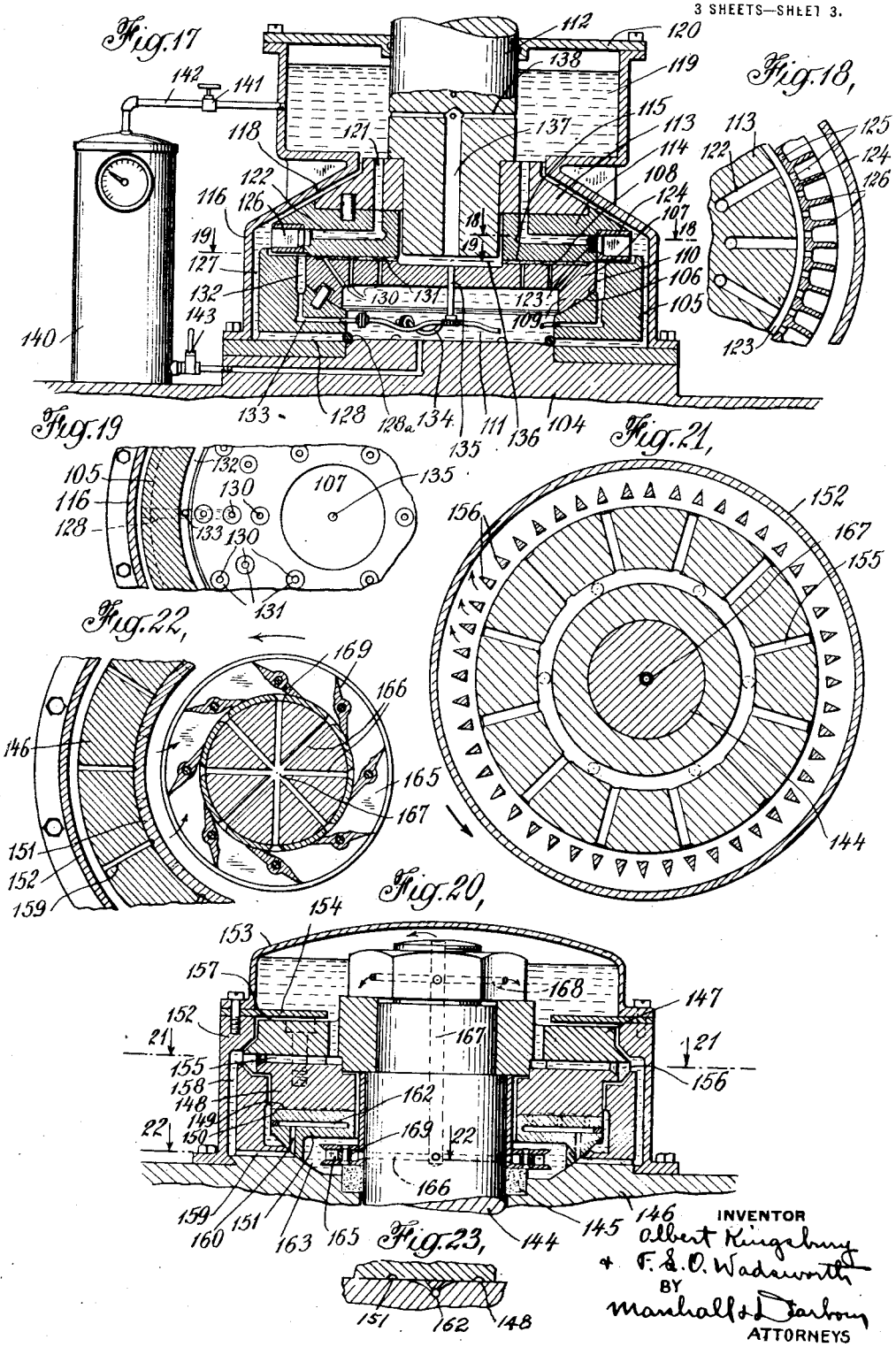

Patented Nov. 21, 1922.

1,436,265

UNITED STATES PATENT OFFICE.

ALBERT KINGSBURY AND FRANK L. O. WADSWORTH, OF PITTSBURGH, PENNSYLVANIA; SAID WADSWORTH ASSIGNOR TO SAID KINGSBURY.

BEARING.

Application filed June 3, 1918. Serial No. 237,873.

*To all whom it may concern:*

Be it known that we, ALBERT KINGSBURY, a citizen of the United States of America, and a resident of Pittsburgh, Allegheny County, and State of Pennsylvania, and FRANK L. O. WADSWORTH, a citizen of the United States of America, and a resident of Pittsburgh, Allegheny County, and State of Pennsylvania, have invented certain new and useful Improvements in Bearings, of which the following is a specification, reference being had to the accompanying drawings forming a part thereof.

Our invention relates to bearings and particularly to those of the continuous ring or collar type, as distinguished from the Kingsbury tiltable shoe bearing in which at least one of the engaging members is composed of one or more separate or flexible joined portions which are free to assume tilted positions in response to the wedging action of the oil and thus automatically establish and maintain a lubricating film between the bearing surfaces.

One object of our invention is to provide a collar bearing that shall be simple in construction and efficient in operation, and in which the bearing surfaces shall be automatically and abundantly supplied with lubricant under pressure by the action of the rotating bearing member, without the aid of any extraneous pumps or pressure devices such as have hitherto been found necessary in supplying the proper amount of oil to the annular bearing surfaces.

Another object is to provide a bearing of the aforesaid character that shall embody self-adjusting means for causing the automatic lubricating action to be equally effective for either direction of bearing rotation.

Another object is to provide a bearing having means dependent on the action of the rotating bearing member for not only supplying plenty of oil to the bearing surfaces when the bearing is in operation, but that shall furthermore store oil under pressure in such manner that it is available for use in lubricating the bearing members at starting.

Still another object is to provide a reversible bearing having two sets of oil passages and turbine blades or buckets adapted to cooperate therewith and arranged to be self-adjusting to select one or the other of said sets of passages, depending on the direction of bearing rotation.

In order that our invention may be thoroughly understood we will now proceed to describe the same in the following specification and then point out the novel features thereof in appended claims. The invention is capable of receiving a variety of mechanical expressions some of which are shown on the accompanying drawings, but it is to be expressly understood that the drawings are for the purpose of illustration only and are not to be construed as a definition of the limits of the invention, reference being had to the appended claims for that purpose.

Referring to the drawings:

Figure 1 is a sectional elevation of a simple bearing structure which embodies our invention and is particularly adapted for high speed operation.

Figure 2 is a sectional plan view on the line 2—2 of Figure 1.

Figures 3 and 4 are sectional circumferential elevations taken respectively on the lines 3—3 and 4—4 of Figure 1, the parts being shown, at the left in Figure 3, as arranged for one direction of bearing rotation, and at the right, as arranged for the opposite direction of bearing rotation.

Figure 5 is a view corresponding to Figure 1 of another embodiment of our invention.

Figure 6 is a partially sectional plan view of the same bearing, the section being taken on the line 6—6 of Figure 5.

Figure 7 is a circumferential section showing, in detail, the arrangement of circumferential oil pockets and the passages which connect the pockets to the bearing surface.

Figure 8 is a sectional plan view taken on the line 8—8 of Figure 9, showing a portion of another embodiment of our invention in which adjustable turbine blades are utilized in connection with two sets of centrifugal passages which are selectively controlled by the blades.

Figure 9 is a sectional elevation showing a portion of the same bearing taken on the line 9—9 of Figure 8.

Figure 10 is a sectional elevation of a bearing which also constitutes an embodiment of our invention and in which a storage reservoir is employed for holding oil under pressure ready for use in starting the bearing.

Figure 11 is a sectional plan view of a portion of the same bearing, taken on the line 11—11 of Figure 10.

Figure 12 is a circumferential section on the line 12—12 of Figure 10 developed into a single plane.

A detail of the thrust surfaces of the same bearing is shown in section on a larger scale in Figure 13.

Figure 14 is a sectional elevation of a further embodiment of our invention in which one of the bearing members may be an independently rotatable or a floating element.

Figure 15 is a sectional plan view on the line 15—15 of Figure 14, with the base and housing broken away.

Figure 16 is a sectional plan view of a portion of the same bearing, taken on the line 16—16 of Figure 14.

Figure 17 corresponds to Figure 10 and shows a further embodiment of our invention in which a storage tank is employed.

Figure 18 is a sectional detail on the line 18—18 of Figure 17, and

Figure 19 is a similar view on the line 19—19 of Figure 17.

Figure 20 is a sectional elevation of another structure embodying our invention in which a storage reservoir is formed in the bearing housing and the distribution and circulation of oil are both determined by the rotation of one of the bearing members.

Figure 21 is a sectional plan on the line 21—21 of Figure 20.

Figure 22 is a partial section on the line 22—22 of Figure 20.

Figure 23 is a small section showing the formation of the bearing members at the thrust surface.

In the form shown in Figs. 1 to 4, 10 designates a base having an opening 11 through which a vertical shaft 12 extends. Affixed to the shaft is a thrust block 13 to which a thrust collar 14 is connected. The thrust collar 14 has an annular bearing surface in which radial pocket grooves or passages 15 are formed. A relatively stationary bearing ring 16 cooperates with the grooved surface of the collar and is mounted on the base in any suitable way as by a ball and socket joint held against rotation by one or more loosely engaging dowel pins 17. The ball and socket joint is shown as formed by a shoulder of the base which has a spherically curved surface 18 cooperating with a correspondingly curved surface 19 on an annular rib or projection 20 of the ring 16. The shaft is surrounded by a sleeve 21 which is fastened to the base in any suitable manner and extends above the bearing surfaces, forming the inner wall of an annular oil reservoir 22 in which the bearing members are disposed. 23 designates the housing of the structure and the outer wall of the oil reservoir.

The base has radial oil passages 24 communicating with vertical passages 25 so as to establish oil connections from the outer portion of the oil reservoir to the inner portion of said reservoir.

We prefer to provide an apertured baffle plate 26 in conjunction with which a screen 27 is disposed so that the oil is screened as it circulates from the housing inwardly through the passages 24 and 25 and upwardly through a turbine element 28 from whence it is discharged into the pocket grooves 15.

This circulation of oil depends on the rotation of the thrust collar and since the pockets 15 are nearly closed at their outer ends—a small opening being left to permit the dirt to work out—pressure is built up in the oil in these passages to a high degree, particularly if the bearing operates at high speed, and is sufficient to squeeze the oil between the thrust bearing surfaces and establish and maintain an oil film as long as the bearing continues to operate.

The turbine element 28 comprises an annular channel-shaped casing 30 which is mounted in an inverted position on the thrust collar 14 so that it covers the inner ends of the pocket grooves 15. Communication is established from the bottom of the channel to each of the grooves by a hole or perforation 31 as clearly shown in both Figures 1 and 3. The turbine element further comprises blades 32 which occupy inclined positions so as to force the oil into the bottom of the channel by reason of the turbine action when the bearing is in operation.

If the bearing is designed to operate only in one direction the turbine blades 32 may obviously be fixed relatively to the channel but if the bearing is reversible, or arranged to operate in either direction, the blades are preferably pivoted near their outer edges on pins 33 (see Figure 3) which extend across the mouth of the channel. Stop pins 34 are also provided near the inner ends of the blades. Therefore the blades are free to rock over their centers and either occupy the positions shown at the left or at the right in Figure 3 depending on the direction of bearing operation, the blades being self-adjusting since the influence of the oil upon them is sufficient to throw them into the correct position. The holes 31 are positioned to transfer the oil from the bottom of the channel directly to the pocket grooves 15.

The vertical passages 25 as shown in Figures 1 and 3 are preferably deeper than necessary to connect with the radial passages 24 so that they form traps into which dirt may settle. They thus may constitute another means for, as far as possible, delivering clean oil to the bearing surfaces.

Any particles of dirt or grit which do work through the pocket grooves 15 will be thrown out centrifugally into the ends of the pocket grooves and will be forced slowly through the saw cut or other small opening 35 which is provided at the outer end of each pocket.

The oil is of course working out between the bearing surfaces all the time and fresh oil is being introduced to maintain the film. This is very advantageous as the oil drawn from the housing is relatively cool and may furthermore be artifically cooled in any well known manner.

To assist in the distribution of oil and establishment of complete oil film between the surfaces, the upper surface of the thrust ring 16 may be provided with a series of shallow grooves or depressions 36 which always serve to hold a certain amount of lubricant in reserve on the surface of the stationary ring. These grooves or depressions are not necessary to the successful maintenance of the film between the bearing surfaces when the bearing is in operation, but they aid in the establishment of the film when the bearing starts from rest, since the rotary movement is then relatively slow and the pressure in the pocket grooves 15 correspondingly small.

The pressure which can be established and maintained in the radial pocket grooves of the rotating thrust collar depends of course on the maximum speed of rotation and upon the radial lengths of the oil grooves. In the case of bearings operating at relatively high speeds—say from 2600 to 3000 R. P. M.—it is possible to obtain, with a device of the character above described, pressures of from 100 to 150 pounds to the square inch at the outer ends of the coil grooves, even when the bearings are of moderate size. This pressure is amply sufficient to maintain a film of lubricant of the desired thickness between the engaging thrust surfaces in case a bearing is operated under moderate thrust pressures such as are commensurate with the oil pressures set up in the oil grooves.

Referring now to Figures 5 to 7 inclusive, in the arrangement here shown the shaft 12 is provided with a thrust block 37 having a spherically curved surface 38 on which a thrust collar 39 is mounted. The collar is self-seating, forming a ball and socket joint with the thrust block, but is caused to rotate with the thrust block by one or more loosely engaging dowel pins 40. The collar has radial passages or pockets 41 which extend from the inner surface of the collar outwardly and backwardly relative to the direction of bearing rotation as indicated by the arrow in Figure 6. The holes are preferably carried through the ring and their outer ends closed—or nearly closed—by plugs 42. Extending downwardly and backwardly from the pockets 41 are oil passages 43 which are adapted to carry oil to the bearing surface 44 of the collar. As clearly shown in Figure 7, the passages are connected to the holes 41 above their centers or at least so as to provide a pocket or trap 45 at the bottom of each passage in which dirt or grit may collect, the clean oil being supplied to the bearing surface.

This arrangement is adapted to operate more effectively in one direction and therefore is well adapted for use where the bearing is not reversible.

The thrust collar cooperates with a base ring 46 which has radial oil passages 47 and a bearing surface 48. The latter is preferably provided with grooves or depressions 36 corresponding to those of Figure 4.

When this bearing is in operation the thrust collar rotates in the direction of the arrow and sets up a pressure in the oil which fills the passages 41. This pressure is partly due to the centrifugal force developed by the rotation and partly to the turbine action of the rearwardly inclined edges of the inner ends of the passages or pockets 41. The pressure thus developed forces the oil out through the backwardly inclined passages 43 and between the thrust surfaces of the rotating thrust collar and the base ring. The necessary film of lubricant is thus established and maintained between these surfaces when the bearing is in operation.

In the embodiment shown in Figures 8 and 9, the thrust collar 49 has a set of radial pocket grooves 15 like those of Figures 1 and 2, but in addition has two circumferentially disposed sets of radial inclined passages or pockets 50 and 51. These passages are formed in the thrust surface like the pocket grooves 15 except at their inner ends, where they communicate with an oil chamber 52 around the sleeve 21, by passages 53 and 54. These passages extend one above the other in an axial direction and are circumferentially offset in such manner that a turbine blade 55 which is pivotally mounted between them is adapted to swing on its pivot and act like a selective valve to open and close the passages in accordance with the direction of bearing rotation.

These blades correspond to a certain extent to the blades 32 to Figure 3, but they have the additional function of controlling the ports for the passages 50 and 51 so that one set of passages is active for one direction of rotation and the other set of passages is active for the other direction of rotation. The radial pocket grooves 15 are active for either direction of bearing rotation.

The structure shown in Figures 10 to 13 inclusive is adapted to operate at relatively low speeds and to sustain relatively high thrust pressures. In other words, it is arranged in such a manner that the rotation of the bearing member produces high oil compression available for establishing and maintaining the lubricating film. As in the previous figures the base, shaft and thrust block are respectively designated 10, 12 and 13, and the base has a sleeve 21 which loosely surrounds the shaft.

In the form here shown, the outer wall of the housing is formed double by concentric plates 56 which provide a water or cooling jacket 57 around the oil reservoir 58. An oil pressure storage tank 59 is located outside the housing and is connected by pipe 62, having a semi-automatic check valve 63, to a cooling coil 61 within the water jacket 57, which coil is also connected to a plurality of passages 64 in the relatively stationary bearing ring 65.

This ring is shown as yieldingly mounted on springs 66 so that it is self-adjusting, the flexibility of the pipe connections being sufficient to permit what little movement may be necessary to equalize the pressure on the thrust surface of the base ring.

As clearly shown in Figure 13, the oil passages 64 each terminate in a shallow recess 67 formed at the bearing surface.

The bearing ring 65 cooperates with a thrust collar 68 which is attached to the thrust block 13 and has a plurality of radial passages 69 as clearly shown in Figure 11. These passages communicate at their inner ends with the openings in a turbine blade ring 70 that is attached to the thrust collar 68, and at their outer ends with openings in a second turbine blade ring 71 that is also attached to and moves with the rotating thrust collar 68.

A stationary deflecting blade ring 72 is mounted adjacent to the turbine ring 71 and is fitted into an annular channel-shaped recess 73 in the ring 68. The arrangement of parts is such that the rings 71 and 72 cooperate when the bearing is in operation to increase the pressure of the oil which has already been placed under compression by the action of the turbine ring 70 and the centrifugal action of the collar 68.

As clearly shown in Figure 11 the oil is discharged through the blades 73 of the turbine ring 72 into an annular passage or chamber 74 which is connected by pipes 75 to the upper turn of the coil 61.

The oil is cooled as it flows through the coil 61 by the action of the water jacket 57 and is forced through the semi-automatic check valve 63 into the pressure tank 59— which contains air or some other compressible fluid—until the pressure is built up to the maximum in the pipe 62. 76 designates a gage which may be employed to indicate the pressure existing in the tank. 60 is an automatic check valve in the connection between each pipe 75 and the coil 61, and 77 is an exhaust nozzle controlled by a valve 78. From the coil 61 the oil is forced under pressure through the pipes 64 into the oil pockets 67 from which it is forced between the bearing surfaces and maintains a lubricating film.

The storage tank is utilized for the purpose of providing a supply of oil under pressure for use at starting; and assuming that the bearing is inactive and that oil is stored under pressure in the tank, it is only necessary when starting the bearing to open the semi-automatic valve 63, whereupon oil will be forced between the bearing surfaces and an oil film established.

The tank may be dispensed with entirely if storage is not required as may also the cooling coil 61, in which event a pipe connection 81, shown in dotted lines, may complete the oil circulation system direct from the annular chamber 74 to the pipe 64.

There are preferably provided a plurality of the radial passages 64 and discharge openings 67 so that the latter are circumferentially distributed over the bearing surface with substantial equality. The vertical passages and discharge openings may of course be arranged in two or more series or rows in the thrust collar if desired instead of in a single row as shown.

We prefer that the lower face of the rotating thrust member 68 shall be provided with spirally arranged grooves 83 as shown in Figures 11 and 13, which aid in distributing the oil that is fed upwardly through the openings 67 over the entire surface of engagement between the fixed and movable thrust members. The bearing shown in these figures is designed to revolve only in one direction, which is indicated by the arrows in Figures 11 and 12, and when rotating in this manner the effect of the turbine rings and the radial passages is to establish relatively high oil pressures which are entirely adequate to effect the lubrication of thrust surfaces of large area operating at comparatively slow speeds.

If the bearing is necessarily reversible the arrangement of Figures 14, 15 and 16 may be employed in which the oil is taken up by radial turbine blades 85 at the inner edge of the thrust block 86, and flows through radial passages 87, being discharged at relatively high pressure through radial turbine blades 88 into a stationary annular collecting chamber 89.

In the form shown, the thrust block 86 has an annular rib or projection 90, through which the passages 87 extend, having a spherical surface 91 on which a thrust collar 92 is seated. This thrust collar is caused to rotate with the thrust block by means of one or more loosely engaging dowel pins 93 but is obviously self-seating so as to equalize the thrust pressure on its anular thrust surface 94.

The base of the bearing which is designated 95 has radial passages 96 which may be connected to a storage tank, such as that shown in Figure 10, by means of a pipe 97. Said passages are connected through telescoping or flexible connections 98 to the annular collecting chamber 89, the telescoping members being extended by springs 99 which, in the arrangement illustrated, serve the additional function of holding the stationary collector ring 89 in place.

The passages 96 at their inner ends are connected by one or more branches 100 to the surface or surfaces of the thrust ring 101 which may be either held stationary by one or more loosely engaging dowel pins 102 or constitute a floating element. In any event the ring is provided with passages 103 and there are enlargements or depressions at the termination of the branch passages at the upper surface of the ring 101, and also at the upper surface of the base on which the bottom surface of the thrust ring rests if said ring is designed to operate as a floating element.

The oil under pressure is distributed when the bearing is in operation from the chamber 89 through the telescoping or flexible connections 98, the passages 96 and the passages 100 and 103 to the bearing surfaces.

In Figures 17, 18 and 19 is shown a footstep bearing structure which also constitutes an embodiment of our invention. In the form shown 104 designates the foundation and 105 an annular base ring having a spherical surface 106 on which a relatively stationary bearing plate or disc 107 is pivotally mounted. The latter has an annular thrust bearing surface 108 and a downwardly extending flange 109 which is provided with a spherical surface 110 to cooperate with the surface 106. The arrangement of parts is such that there is a pocket or chamber 111 below the bearing plate 107 within the base 105.

The rotatable member of the bearing comprises a shaft 112 having a thrust block 113 to which is secured a thrust collar 114. The latter has an annular bearing surface 115 which cooperates with the surface 108. The bearing is enclosed in a housing 116 which is arranged to quite closely surround the rotatable member of the bearing, leaving only a relatively narrow annular oil passage 118 between them. The housing is enlarged at the top to form an oil reservoir 119 and is provided with a removable cap 120.

The rotary member or rotor of the bearing is arranged to act like the impeller of a rotary centrifugal pump in forcing the oil between the surfaces of engagement of the relatively fixed and movable members of the bearing. The oil which is contained in the chamber 119 above the level of the rotary member is supplied to the outer periphery of said member through the passage 118 and through axial passages 121 and radial passages 122 which open into an annular passage 123 as clearly shown in Figure 18. An impeller member 124 is secured to the thrust collar 114 so as to close the opening of the annular chamber 123 except for a plurality of ports 125 in the inner side of the impeller member which permit the oil to flow outwardly between the radial blades 126 of the impeller.

The formation of the housing, as clearly shown in Figure 17, is such that the passage 118 is narrow and consequently the adjacent surface of the rotatable thrust block acts as an impeller in assisting the action of the passages 122 and the impeller 124 in forcing the oil under pressure into the annular discharge chamber 127 and thence through the passage ways 128 into the chamber 111. In other words, the outer surface of the thrust block acts as in the Kingsbury reverse oiling system as set forth in his Patent 1,201,057 granted October 10, 1916.

When the bearing is in operation the oil is thrown radially outward by the centrifugal action of the radial passages 122 and by the blades 126. It then passes through the annular space 127 and inwardly through radial passages 128, and is discharged past the ball valves 128[a] into the inner chamber 111. The oil is thus maintained in this chamber under pressure, and a certain portion of it is forced between the cooperating surfaces 106 and 110 of the ball and socket joint. The large proportion of the oil however, is forced upwardly through passages 130, in the bearing plate 107, which terminate in large openings 131 at the bearing surface as clearly shown in Figure 19.

A lubricating film is thus established and maintained between the bearing surfaces 108 and 115.

The oil flows radially outward from the bearing surfaces into an annular space 132 and is carried through passages 133 in the base and flexible pipes 134 to a central opening 135 in the bearing plate 107. A return connection is established from a chamber 136 through a central opening 137 and radial openings 138 in the shaft to the reservoir 119.

The passages 138 are centrifugal discharge passages and provide a suction which lifts the oil from the chamber 136 and from the pipe 135.

The suction in the chamber 136 furthermore has the effect of insuring that the inner portions of the bearing surfaces are lubricated since it, to a greater or less degree, compensates for the slight centrifugal influence tending to move the oil film radially outward.

In order to provide an oil film at starting a storage reservoir 140 may be connected near the bottom, as shown in Figure 17, to the reservoir 111 and at the top to the reservoir 119. The valve 141 is arranged to close the connection 142 between the upper reservoir and the top of the tank and a check valve 143 is arranged to prevent the loss of pressure in the tank when the bearing comes to rest during the stopping period. The valve 143 is semi-automatic and when it is desired to start the bearing this valve is opened and oil under pressure is admitted from the tank 140 to the chamber 111, the action of the oil in establishing the film being as already described.

The embodiment of our invention which is shown in Figures 20 to 23 inclusive operates on the same general principle as that shown in Figures 17 to 19 inclusive. In this arrangement the shaft 144 extends through a stuffing box or packing ring 145 in the base 146 and has a thrust block 147 affixed at its upper end. A thrust collar 148 is attached to the thrust block and has a thrust bearing surface 149. This surface cooperates with the surface 150 of a base ring 151 which, in the form shown, is mounted on the base 146 by a ball and socket joint. The housing 152 corresponds to the housing 115 and has a cap 153 with a baffle plate 154 extending inwardly over the thrust block 147.

The thrust block is radially grooved to provide passages 155 which correspond to the passages 122 and from which oil is discharged through impeller blades 156 as shown in Figure 21.

The baffle plate 154 provides a narrow passage 157 adjacent to the outer radial surface of the thrust block whereby the oil is forced centrifugally through this passage and assists the passages 155 in maintaining the oil in the annular chamber 158 under pressure. Oil is forced from this chamber through a passage 159 in the base, upwardly through a communicating passage 160 in the ring 151 and through a distributing passage 162 to the bearing surface 150. As shown in Fig. 23, passage 162 may be branched for either direction of bearing rotation.

The oil is thus forced between the bearing surfaces and as it is gradually squeezed out at either side it flows into a chamber 163, part of the oil being conducted through a passage provided therefor and part working between the engaging surfaces of the ball and socket joint.

From the chamber 163 oil is forced by a turbine element 165 radially inward through passages 166, up through an auxiliary passage 167 in the shaft and either out at the top of this passage into the reservoir or out through radial discharge passages 168.

The passage 167 may be closed at the top so as to make the passages 168 more effective in their action as centrifugal discharge members. They thus produce a suction which offsets the influence due to centrifugal force which tends to oppose the inward flow of oil through the passages 166.

The radial passages 168 are not necessary however since the turbine action of the element 165 is more powerful than the centrifugal action in the passages 166.

The turbine element 165 is preferably formed as shown in Figure 22 so that it is reversible, or adapted to accommodate itself to the direction of bearing operation. As here shown it comprises a plurality of tiltable blades 169 which are circumferentially distributed about the shaft and occupy positions either as shown in Figure 22, or oppositely inclined positions, depending on the direction in which the shaft is rotating. The arrow above Figure 22 indicates the direction of rotation corresponding to the position in which the blades are represented.

While we have shown a number of structures which embody our invention they have been selected only for the purpose of illustration, since our invention is by no means limited thereto. We intend that only such limitations be imposed as are indicated in the appended claims. In said claims the term "radial" is used in contradistinction to circumferential, and as generic to elements on a true radius or inclined thereto.

What we claim is:

1. In a thrust bearing, the combination of a rotatable thrust member, a cooperating thrust member, and means on said rotatable member and dependent on its rotation for developing pressure in the oil and forcing the same between the bearing surfaces.

2. In a thrust bearing, the combination of a rotatable thrust member, a cooperating thrust member, and means on said rotatable member utilizing the centrifugal force developed by the rotation of the same for developing pressure in the oil and forcing the same between the bearing surfaces.

3. In a thrust bearing, the combination with a rotatable thrust member having an annular thrust surface, another thrust member having a cooperating thrust surface, one of said surfaces being provided with oil pockets, and means dependent on the rotation of the rotatable member for forcing oil under pressure between the bearing surfaces.

4. In a thrust bearing, the combination with a rotatable thrust member having an annular thrust surface, another thrust member having a cooperating thrust surface, one of said surfaces being provided with oil pockets, and means utilizing the centrifugal force produced by the rotation of the rotatable member for forcing oil under pressure between the bearing surfaces.

5. In a thrust bearing, the combination with a rotatable thrust member having an annular bearing surface provided with radial grooves extending into proximity to the outer edge of the surface, a cooperating thrust member, and means dependent on the rotation of the rotatable member for forcing oil into said grooves.

6. In a thrust bearing, the combination of a rotatable thrust member, a cooperating thrust member, and turbine blades carried by the rotatable member for forcing oil under pressure between the bearing surfaces.

7. In a thrust bearing the combination with a rotatable thrust member having an annular thrust surface, another thrust member having a cooperating thrust surface, one of said surfaces being provided with oil pockets, and turbine blades associated with the rotatable member for forcing oil into said oil pockets.

8. In a thrust bearing, the combination with a rotatable thrust member having an annular bearing surface and provided with radial grooves extending into proximity to the outer edge of the surface, a cooperating thrust member, and turbine blades associated with the rotatable member and adapted to force oil under pressure into said radial grooves.

9. In a thrust bearing, the combination with a rotatable thrust member having an annular bearing surface and provided with radial passages extending into proximity to the outer edge of the surface, a cooperating thrust member, and automatically reversible means dependent on the rotation of the rotatable member for pumping oil into said radial passages.

10. In a thrust bearing, the combination with a rotatable thrust member having an annular bearing surface and provided with radial passages extending into proximity to the outer edge of the surface, a cooperating thrust member, and reversible blades adapted to force oil into said passages for either direction of bearing rotation.

11. In a thrust bearing, the combination with a rotatable thrust member having an annular bearing surface and provided with radial passages extending into proximity to the outer edge of the surface, a cooperating thrust member, and an annular turbine member secured to the rotatable member at the inner edge of the thrust surface.

12. In a thrust bearing, the combination with a rotatable thrust member having an annular bearing surface and provided with radial passages extending into proximity to the outer edge of the surface, a cooperating thrust member, and a turbine member secured to the rotatable member at the inner edge of the thrust surface and having turbine blades mounted adjacent the inlets of said passages.

13. In a thrust bearing, the combination with a rotatable thrust member having an annular bearing surface and provided with radial passages extending into proximity to the outer edge of the surface, a cooperating thrust member, and a turbine member secured to the rotatable member at the inner edge of the thrust surface and having pivoted turbine blades adapted to be automatically reversed according to the direction of bearing rotation.

14. In a thrust bearing, the combination with a rotatable thrust member having an annular bearing surface and provided with radial passages, a cooperating thrust member, and turbine blades secured to the rotatable member at the inner edge of the thrust surface.

15. In a thrust bearing, the combination with a rotatable thrust member having an annular bearing surface and provided with radial passages, a cooperating thrust member, and pivoted turbine blades secured to the rotatable member at the inner edge of the thrust surface.

16. In a thrust bearing, the combination with a rotatable thrust member having an annular bearing surface and provided with radial passages, a cooperating thrust member, and turbine blade secured to the rotatable member at the inner edge of the thrust surface adjacent the inlets of said passages.

17. In a thrust bearing, the combination with a rotatable thrust member having an annular bearing surface and provided with radial passages, a cooperating thrust member, and turbine blades adapted to force oil under pressure into said radial passages.

18. In a thrust bearing, the combination of an oil reservoir, cooperating stationary and rotatable thrust members therein dividing the reservoir into an outer and an inner oil chamber, oil return passages in the stationary member, and means responsive to rotation of the rotatable member for forcing oil under pressure between the bearing surfaces.

19. In a thrust bearing, the combination of an oil reservoir, cooperating stationary and rotatable thrust members therein dividing the reservoir into an outer and an inner oil chamber, oil return passages in the stationary member, and turbine blades carried by the rotatable member for forcing oil under pressure between the bearing surfaces.

20. In a thrust bearing, the combination of an oil reservoir, cooperating stationary and rotatable thrust members therein dividing the reservoir into an outer and an inner oil chamber, oil return passages in the stationary member, and an annular turbine member secured to the rotatable member at the inner edge of the thrust surface.

21. In a thrust bearing, the combination of an oil reservoir, cooperating stationary and rotatable thrust members therein dividing the reservoir into an outer and an inner oil chamber, oil return passages in the stationary member, and means dependent on the rotation of the rotatable member and operative in either direction of bearing rotation for forcing oil under pressure between the bearing surfaces.

22. In a thrust bearing, the combination of an oil reservoir, cooperating stationary and rotary thrust members therein dividing the reservoir into an outer and an inner oil chamber, oil return passages in the stationary member, and means comprising reversible turbine blades for forcing oil under pressure between the bearing surfaces.

23. In a thrust bearing, the combination of a relatively stationary thrust member and a cooperating rotatable thrust member having inclined radial turbine passages therein and an annular bearing surface, said turbine passages communicating with said bearing surface.

24. In a thrust bearing, the combination of a relatively stationary thrust member and a cooperating rotatable thrust member having two sets of oppositely inclined radial turbine passages extending into proximity to the outer edge of said member, radial oil grooves in said surface communicating with said inclined turbine passages, and valves for selecting one or the other of said sets of turbine passages dependent on the direction of bearing rotation.

25. In a thrust bearing, the combination of a relatively stationary thrust member and a cooperating rotatable thrust member having two sets of oppositely inclined radial turbine passages extending into proximity to the outer edge of said member, and valves for automatically selecting one set of said passages dependent on the direction of bearing rotation.

26. In a thrust bearing the combination of a relatively stationary thrust member and a cooperating rotatable thrust member having a set of turbine passages extending across it in a plane substantially parallel to the surface, and turbine blades at the inner ends of said passages for directing the oil therein.

27. In a thrust bearing, the combination of a relatively stationary thrust member and a cooperating rotatable thrust member having two sets of oppositely inclined radial turbine passages extending into proximity to the outer edge of said member, and turbine blades automatically reversible with the rotatable member for directing oil into one or the other of said sets of passages.

28. In a thrust bearing, the combination of a relatively stationary thrust member and a cooperating rotatable thrust member having two sets of oppositely inclined radial turbine passages extending into proximity to the outer edge of said member, and turbine blades automatically reversible with the rotatable member for directing oil into one or the other of said sets of passages and constituting valves for closing the other set.

29. In a thrust bearing, the combination of a thrust collar having a bearing surface, a cooperating thrust collar, an oil reservoir in which the thrust members are disposed, and turbine elements for forcing oil under pressure between the bearing surfaces.

30. In a thrust bearing, the combination with a rotatable thrust member having an annular bearing surface and provided with radial oil passages, a cooperating thrust member, and automatically reversible means depending on the rotation of the rotatable member for pumping oil into said radial passages.

31. In a thrust bearing, the combination with a rotatable thrust member having an annular bearing surface and provided with radial oil passages, a cooperating thrust member, and reversible blades adapted to force oil into said passages for either direction of bearing rotation.

32. In a thrust bearing, the combination with a rotatable thrust member having an annular bearing surface and provided with radial oil passages, a cooperating thrust member, and means dependent on the rotation of the rotatable member and operative for either direction of bearing rotation for forcing oil into said passages.

33. In a thrust bearing, the combination of a relatively stationary thrust member, and a cooperating rotatable thrust member having two sets of oppositely inclined radial turbine passages therein communicating with the bearing surface of said member.

34. In a thrust bearing, the combination of a relatively stationary thrust member, a cooperating rotatable thrust member having two sets of oppositely inclined radial turbine passages therein communicating with the bearing surface of said member, and means for automatically determining which of said sets of passages shall convey oil to said bearing surface.

35. In a thrust bearing, the combination of a rotatable thrust member, a cooperating thrust member, and an oil reservoir in which said members are disposed, said rotatable thrust member being constructed to collect and force oil under pressure between the bearing surfaces of said members.

36. In a thrust bearing, the combination of a rotatable thrust member, a cooperating thrust member, and an oil reservoir in which said members are disposed, said rotatable thrust member being provided with radial passages which operate by centrifugal action to force oil under pressure between the bearing surfaces of said members.

37. In a thrust bearing, the combination of a rotatable thrust member, a cooperating thrust member, and an oil reservoir in which said members are disposed, said rotatable thrust member being provided with turbine blades which operate to collect and force oil under pressure between the bearing surfaces of said members.

38. In a thrust bearing, the combination of a rotatable thrust member, a cooperating thrust member, and an oil reservoir in which said members are disposed, said rotatable thrust member being provided with radial passages and turbine blades which cooperate to force oil under pressure between the bearing surfaces of said members.

39. In a thrust bearing, the combination of a rotatable thrust member, a cooperating thrust member, and an oil reservoir in which said members are disposed, said rotatable thrust member being provided with radially inclined passages which operate to force oil under pressure between the bearing surfaces of said members.

40. In a thrust bearing, the combination of a rotatable thrust member, a cooperating thrust member, an oil reservoir in which said members are disposed, said rotatable thrust member being provided with passages which operate to force oil under pressure between the bearing surfaces of said members, and means whereby said passages are effective for either direction of bearing rotation.

41. In a thrust bearing, the combination of a rotatable thrust member, a cooperating thrust member, an oil reservoir in which said members are disposed, said rotatable thrust member being provided with radial passages which operate to force oil under pressure between the bearing surfaces of said members, and automatically operating blades for rendering said passages effective for either direction of bearing rotation.

42. A thrust bearing comprising a rotatable member provided with radial oil passages, and means dependent on the rotation of said member whereby oil is forced through said passages for either direction of rotation of said member.

43. A thrust bearing comprising a rotatable member provided with radial oil passages, and automatically reversible means for effecting a flow of oil through said passages for either direction of rotation of said member.

44. A thrust bearing comprising a rotatable member provided with radial oil passages, and pivoted blades adjacent the inlets of said passages for forcing oil therethrough for either direction of rotation of said bearing.

45. In a thrust bearing, the combination with a rotatable member having an annular bearing surface and provided with oil passages extending into proximity to the outer edge of said surface, a cooperating thrust member, and means dependent on the rotation of the rotatable member for forcing oil into said passages.

46. In a thrust bearing, the combination with a rotatable member having an annular bearing surface and provided with oil passages extending into proximity to the outer edge of said surface, a cooperating thrust member, and blades on the rotatable member for forcing oil into said passages.

47. In a thrust bearing, the combination of a rotatable thrust member, a cooperating thrust member, and reversible turbine blades mounted on said rotatable member for forcing oil between the bearing surfaces.

48. In a thrust bearing, the combination of a rotatable thrust member having an annular bearing surface and provided with radial oil passages, a cooperating thrust member having a bearing surface, and reversible blades adapted to force oil under pressure into said passages for either direction of shaft rotation.

49. In a thrust bearing, the combination of a rotatable thrust member having an annular bearing surface and provided with radial oil passages, a cooperating thrust member having a bearing surface, and automatically reversible means dependent on the rotation of the rotatable member for forcing oil under pressure into said passages.

50. In a thrust bearing, the combination of a rotatable thrust member, a cooperating thrust member, said rotatable thrust member being provided with two sets of passages which are operative to force oil under pressure between the bearing surfaces of said members, and means for rendering either set of passages operative for the corresponding direction of rotation of said rotatable member and simultaneously closing the other set of passages.

51. In a thrust bearing, the combination of a rotatable thrust member, a cooperating thrust member, and oil grooves operative for either direction of bearing rotation for developing pressure in the oil and forcing the same under pressure between the bearing surfaces.

52. In a thrust bearing, the combination of a stationary thrust member and a rotatable thrust member having an annular bearing surface provided with oil passages extending into proximity to the outer edge of the surface, said passages operating by centrifugal force to develop pressure in the oil and force the same between the bearing surfaces.

53. In a thrust bearing, the combination of a rotatable thrust member, a cooperating thrust member, and oil passages in the rotatable member operative by centrifugal force to develop pressure in the oil and force the same under pressure between the bearing surfaces.

54. In a thrust bearing, the combination of a rotatable thrust member, a cooperating thrust member, an oil well in which said members are disposed, and means on the rotatable member for collecting oil and developing pressure therein to force the same under pressure between the bearing surfaces.

In witness whereof, we have hereunto set our hands this 29th day of May, 1918.

ALBERT KINGSBURY.
FRANK L. O. WADSWORTH.